(12) United States Patent
Chen et al.

(10) Patent No.: US 7,448,702 B2
(45) Date of Patent: Nov. 11, 2008

(54) MOUNTING ASSEMBLY OF COMPUTER ENCLOSURE

(75) Inventors: Yun-Lung Chen, Tu-Cheng (TW); Fa-Ming Jiang, Shenzhen (CN); Gang Su, Shenzhen (CN)

(73) Assignees: Hong Pu Jim Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/238,486

(22) Filed: Sep. 28, 2005

(65) Prior Publication Data

US 2006/0146490 A1 Jul. 6, 2006

(30) Foreign Application Priority Data

Dec. 30, 2004 (CN) .................... 2004 2 0103591 U

(51) Int. Cl.
*H05K 5/00* (2006.01)
(52) U.S. Cl. ................. 312/223.2; 312/265.6; 361/726; 361/727; 292/150; 292/DIG. 11
(58) Field of Classification Search .............. 312/223.2, 312/223.1, 222, 265.6, 205; 361/725, 726, 361/727; 292/137, 161, 159, 150, 152, DIG. 11
See application file for complete search history.

(56) References Cited

U.S. PATENT DOCUMENTS

| | | | | |
|---|---|---|---|---|
| 4,939,622 | A * | 7/1990 | Weiss et al. ................. | 361/727 |
| 5,593,220 | A * | 1/1997 | Seid et al. ................. | 312/265.6 |
| 5,743,606 | A * | 4/1998 | Scholder ................... | 312/223.2 |
| 5,980,003 | A * | 11/1999 | Huang ...................... | 312/223.2 |
| 6,028,765 | A * | 2/2000 | Swindler et al. ............ | 361/683 |
| 6,059,386 | A * | 5/2000 | Yu .......................... | 312/223.2 |
| 6,550,877 | B1 * | 4/2003 | Anderson et al. ........ | 312/223.2 |
| 6,935,661 | B1 * | 8/2005 | Farnsworth et al. ......... | 292/162 |
| 6,999,320 | B2 * | 2/2006 | Fan ............................. | 361/725 |
| 7,075,791 | B2 * | 7/2006 | Strmiska et al. ............. | 361/727 |
| 7,269,020 | B2 * | 9/2007 | Wang et al. ................. | 361/727 |
| 2003/0210514 | A1 * | 11/2003 | Liu et al. ..................... | 361/683 |

FOREIGN PATENT DOCUMENTS

TW 446140 7/2001

* cited by examiner

*Primary Examiner*—Janet M. Wilkens
*Assistant Examiner*—Mart K Kuhn
(74) *Attorney, Agent, or Firm*—Morris Manning Martin LLP; Tim Tingkang Xia

(57) ABSTRACT

A mounting assembly of a computer enclosure includes a chassis (90), a front panel (10) slidably mounted to the chassis (90), a pair of locking members (30) attached to the front panel (10), a pair of sliding members (50) fixedly attached to the chassis (90) and a pair of pressing members (70) movably mounted to the chassis (90) for unlocking the locking members (30). Each sliding member (50) has a sliding portion (53). Each locking member (30) defines a sliding groove (31) therein. The sliding portion (53) of the sliding member (50) is engaged in the sliding groove (31) for securing the front panel (10) on the chassis (90).

16 Claims, 6 Drawing Sheets

MOUNTING ASSEMBLY OF COMPUTER ENCLOSURE

BACKGROUND OF THE INVENTION

1. Field of the Invention

The present invention relates to a mounting assembly of a computer enclosure, and more particularly to a mounting assembly of a computer enclosure for attaching or detaching a front panel conveniently.

2. Background of the Invention

With the advancement of science and technology, computers are widely used in every walk of life. More and more computer users hope to detach a computer enclosure conveniently for checking malfunction of hardware and repairing interior components of a computer. However, nowadays, with the tide of miniature computer enclosure, computer users are of inconvenience in operation in incommodious computer enclosure. In addition, an expanded function of the computer enclosure is also limited. Therefore, it is required that a front panel should be demounted conveniently from a chassis. A typical mounting assembly is that a front panel is directly riveted to a chassis or a front panel is integrally molded with a chassis. However, the front panel cannot be detached when necessary for installation or removal of other electronic components, which probably causes damage of the electronic components due to insufficient room.

Generally, that the front panel can not be detached can bring much trouble when computer users assemble or disassemble electronic components in incommodious computer enclosure. This also inevitably increases the assembly time. As a result, production efficiency is reduced to a certain degree. Understandably, some attempts have been taken to introduce the enclosure without screws.

What is needed, therefore, is a mounting assembly of a computer enclosure facilitating assembly and disassembly in a chassis.

SUMMARY

A mounting assembly of a computer enclosure includes a chassis, a front panel slidably mounted to the chassis, a pair of sliding members fixedly attached to the chassis, a pair of locking members fixed to the front panel and a pair of pressing members adapted to be movably mounted to the chassis for unlocking the locking members. Each sliding member is formed to have a sliding portion thereon. Each locking member defines a sliding groove therein. The sliding portion of the sliding member is engaged in the sliding groove of the locking member for securing the front panel on the chassis.

Other advantages and novel features of the present invention will be drawn from the following detailed description of preferred embodiment of the present invention with the attached drawings, in which:

DETAILED DESCRIPTION OF THE INVENTION

Figure 1:
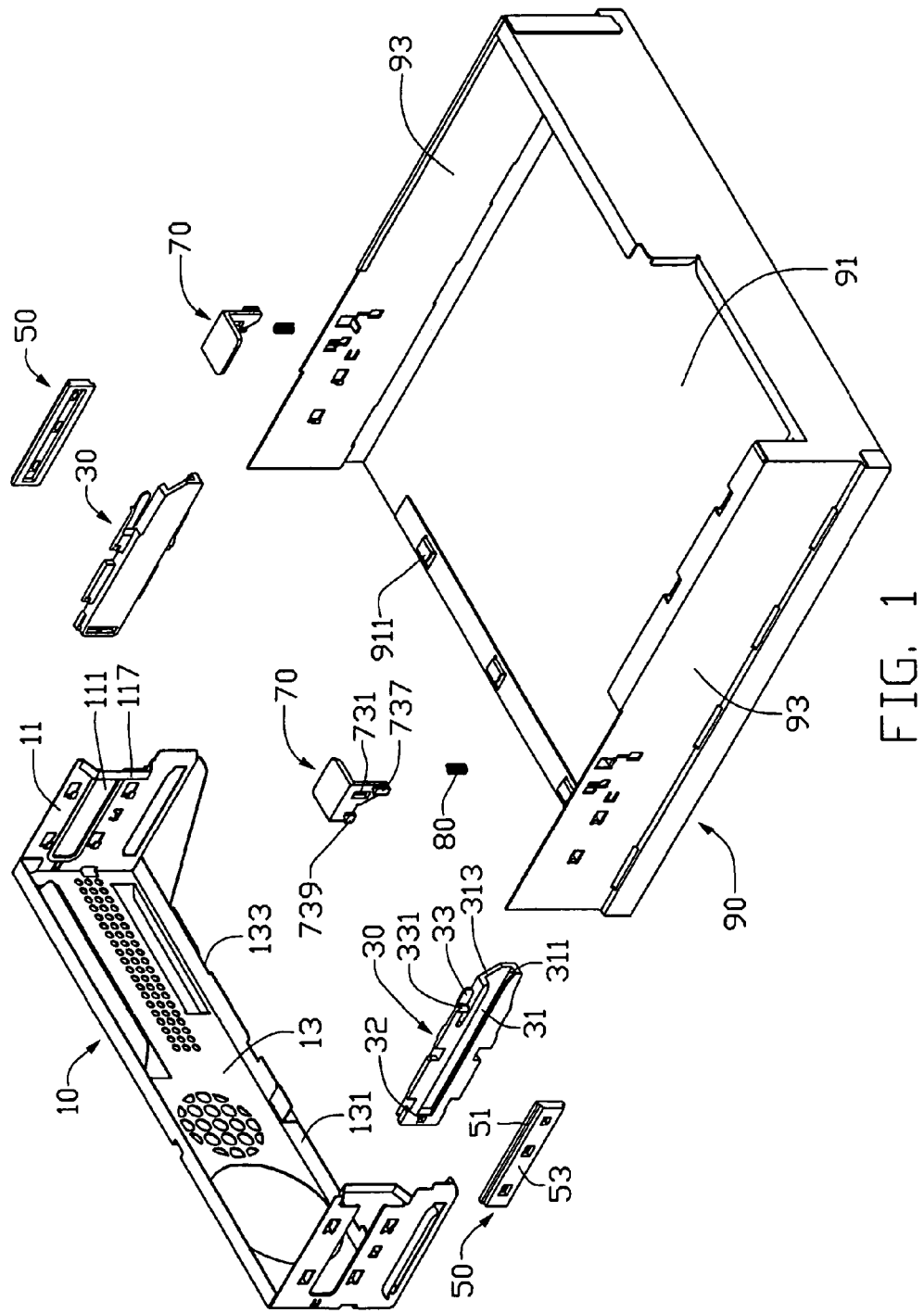
FIG. 1 is an exploded, isometric view of a mounting assembly of a computer enclosure in accordance with a preferred embodiment of the present invention including a front panel, a pair of locking members, a pair of sliding members, a pair of pressing members and a chassis.
Figure 2:
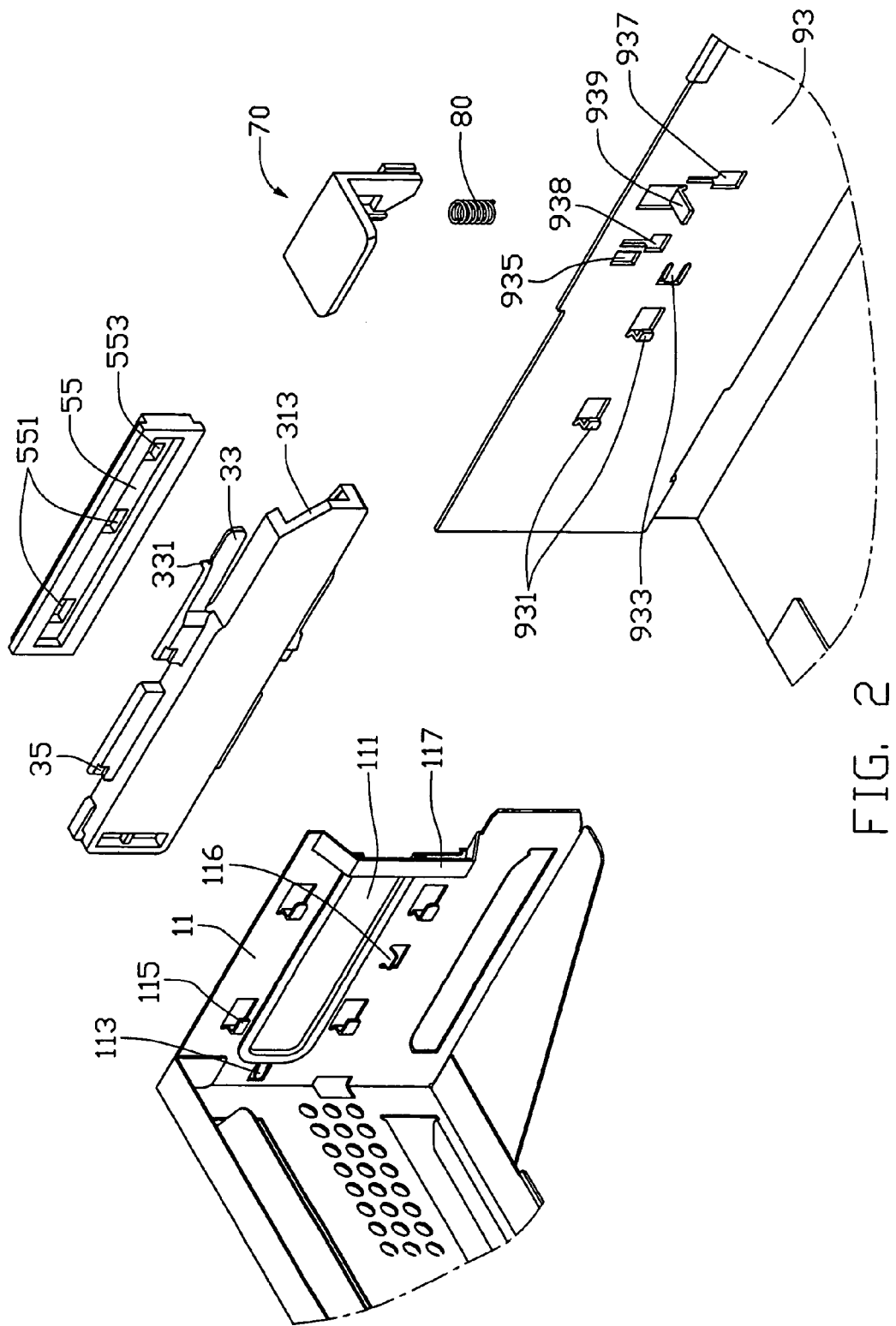
FIG. 2 is partially an enlarged, isometric view of FIG. 1.

Referring to FIGS. 1 and 2, a mounting assembly of an enclosure of an electronic device like a computer in accordance with a preferred embodiment of the present invention includes a front panel 10, a pair of locking members 30, a pair of sliding members 50, a pair of pressing members 70 and a chassis 90.

The front panel 10 has a frontwall 13 and two opposite sidewalls 11. The frontwall 13 is bent inwardly and vertically to form flanges 131 at top and bottom edges thereof, and the lower flange 131 defines a plurality of cutouts 133. An elongated opening 111 is defined in the sidewall 11 of the front panel 10. A locking tab 113 is formed on the sidewall 11 of the front panel 10 adjacent to the opening 111. A plurality of L-shaped hooks 115 is formed on the inner side of sidewall 11 at an upper edge and a lower edge of the opening 111. A protruding tab 116 is formed on the inner side of the sidewall 11 under the opening 111. A connecting bridge 117 rides over the opening 111 at a rear end thereof.

A sliding groove 31 is defined in the locking member 30. A guiding portion 311 and a slanted pushing surface 313 are formed on the locking member 30 at a rear end thereof. A securing hole 32 is defined in the locking member 30 at a front end thereof corresponding to the locking tab 113 of the front panel 10. An elastic tab 33 is formed on the locking member 30 at an upper end thereof. A locking protrusion 331 extends outwards from the elastic tab 33. A plurality of recesses 35 is defined in the locking member 30 at top and bottom edges thereof corresponding to the hooks 115.

The sliding member 50 is formed to have a wide inserting portion 51 and a narrow sliding portion 53. A rectangular groove 55 is defined in a middle portion of the sliding member 50. A plurality of positioning holes 551 and a securing hole 553 are also defined in the groove 55.

Figure 3:
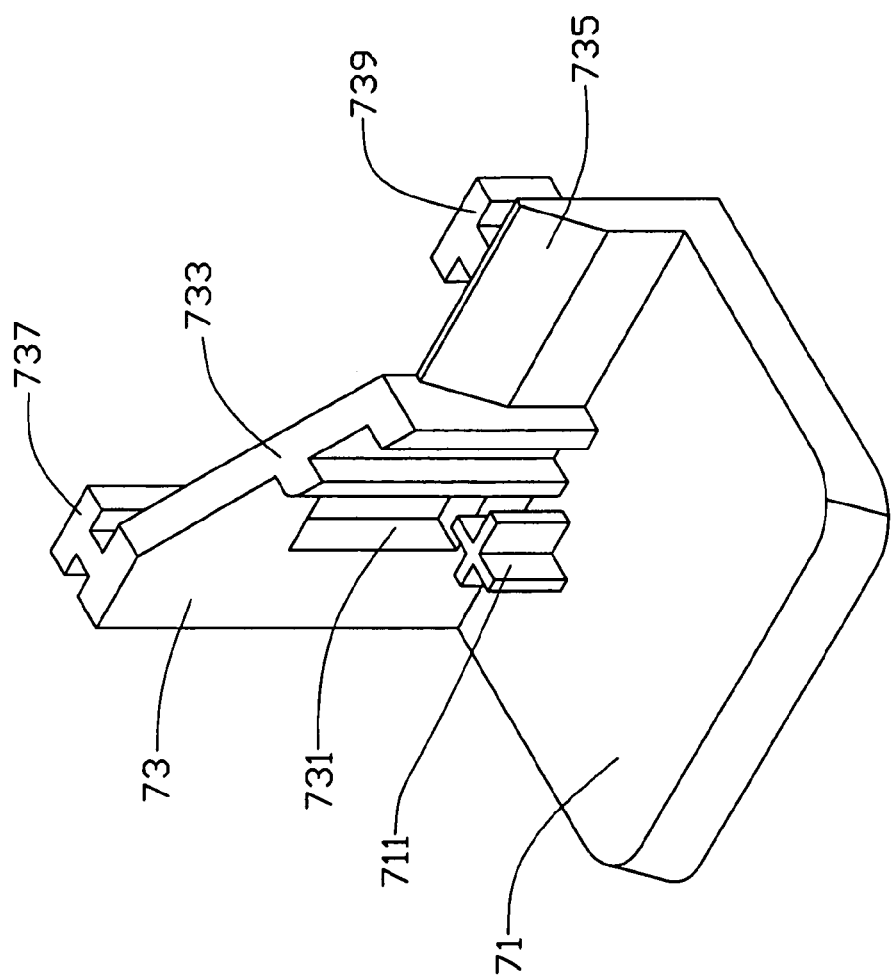
FIG. 3 is an enlarged, isometric view of the pressing member of FIG. 1, but viewed from another aspect.

Referring also to FIG. 3, the pressing member 70 includes a pressing portion 71 and a supporting portion 73. A post 711 adjacent to the supporting portion 73 extends vertically from the pressing portion 71. A spring 80 is disposed around the post 711. A rectangular through hole 731 is defined in the supporting portion 73 adjacent to the post 711. The supporting portion 73 is formed to have a slanted pushing portion 733 corresponding to the slanted pushing surface 313 of the locking member 30. A wedge-shaped block 735 is formed on the supporting portion 73. A pair of T-shaped sliding blocks 737, 739 is extended vertically and outwards from the supporting portion 73.

The chassis 90 includes a bottom panel 91 and two opposite side panels 93. The bottom panel 91 forms a plurality of positioning tabs 911 corresponding to the cutouts 133 of the front panel 10. A plurality of hooks 931 is formed on the inner side of the side panel 93 corresponding to the positioning holes 551 of the sliding member 50. A locking tab 933 is also formed on the inner side of the side panel 93 corresponding to the securing hole 553 of the sliding member 50. A locking hole 935 is defined in the side panel 93 for the locking protrusion 331 of the locking member 30 extending therethrough. Two T-shaped positioning holes 937, 938 are defined in the side panel 93 for the T-shaped sliding blocks 737,739 of the pressing member 70 extending therethrough. A protruding tab 939 is extended perpendicularly from the side panel 93 for supporting the spring 80.

Figure 4:
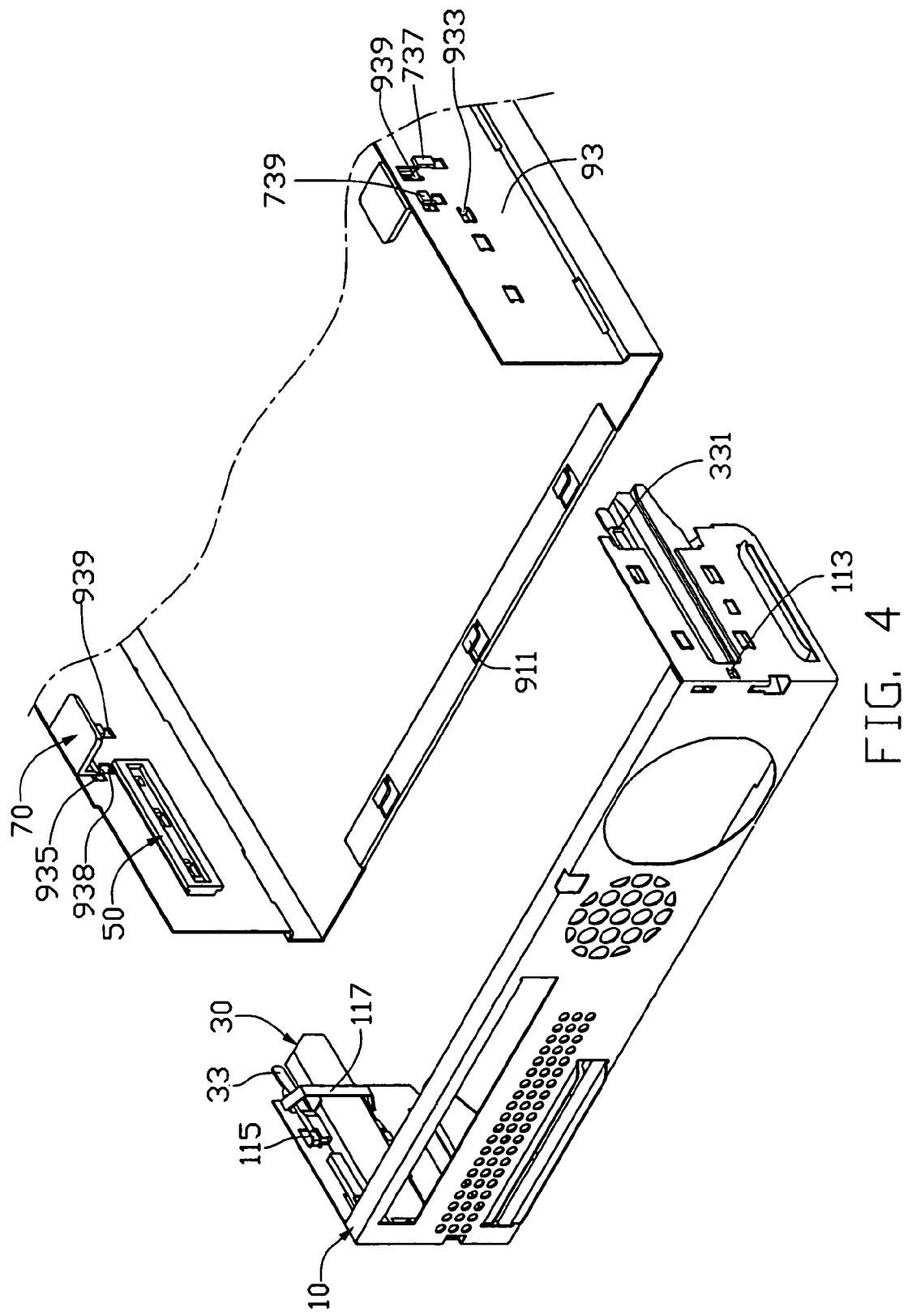
FIG. 4 is an pre-assembled isometric view of FIG. 1, but without the front panel mounted on the chassis.

Referring also to FIG. 4, before the front panel 10 is mounted to the chassis 90, the locking member 30 is mounted to the front panel 10. The locking member 30 is pushed forwards to cause the hooks 115 of the front panel 10 to engage in the recesses 35 of the locking member 30. The locking tab 113 of the sidewall 11 is flexed and then snappingly engages in the securing hole 32 of the locking member 30. The protruding tab 116 supports the locking member 30 thereon. Consequently, the locking member 30 is securely attached to the front panel 10. Similarly, when the sliding member 50 is pushed forwards, the hooks 931 of the chassis 90 snappingly engage in the positioning holes 551. Then, the locking tab 933 is flexed inwards and snappingly engages in the securing hole 553 of the sliding member 50. Accordingly, the sliding member 50 is fixedly attached to the side panel 93 of the chassis 90. The spring 80 is placed around the post 711 of the pressing member 70. The T-shaped sliding blocks 737, 739 are respectively extended through the T-shaped positioning holes 937, 938 and can slide upwardly along the T-shaped positioning holes 937, 938. The protruding tab 939 of the side panel 93 is extended through the rectangular through hole 731 of the pressing member 70 for retaining the spring 80. Thus, the pressing member 70 is slidably mounted to the chassis 90.

Figure 5:
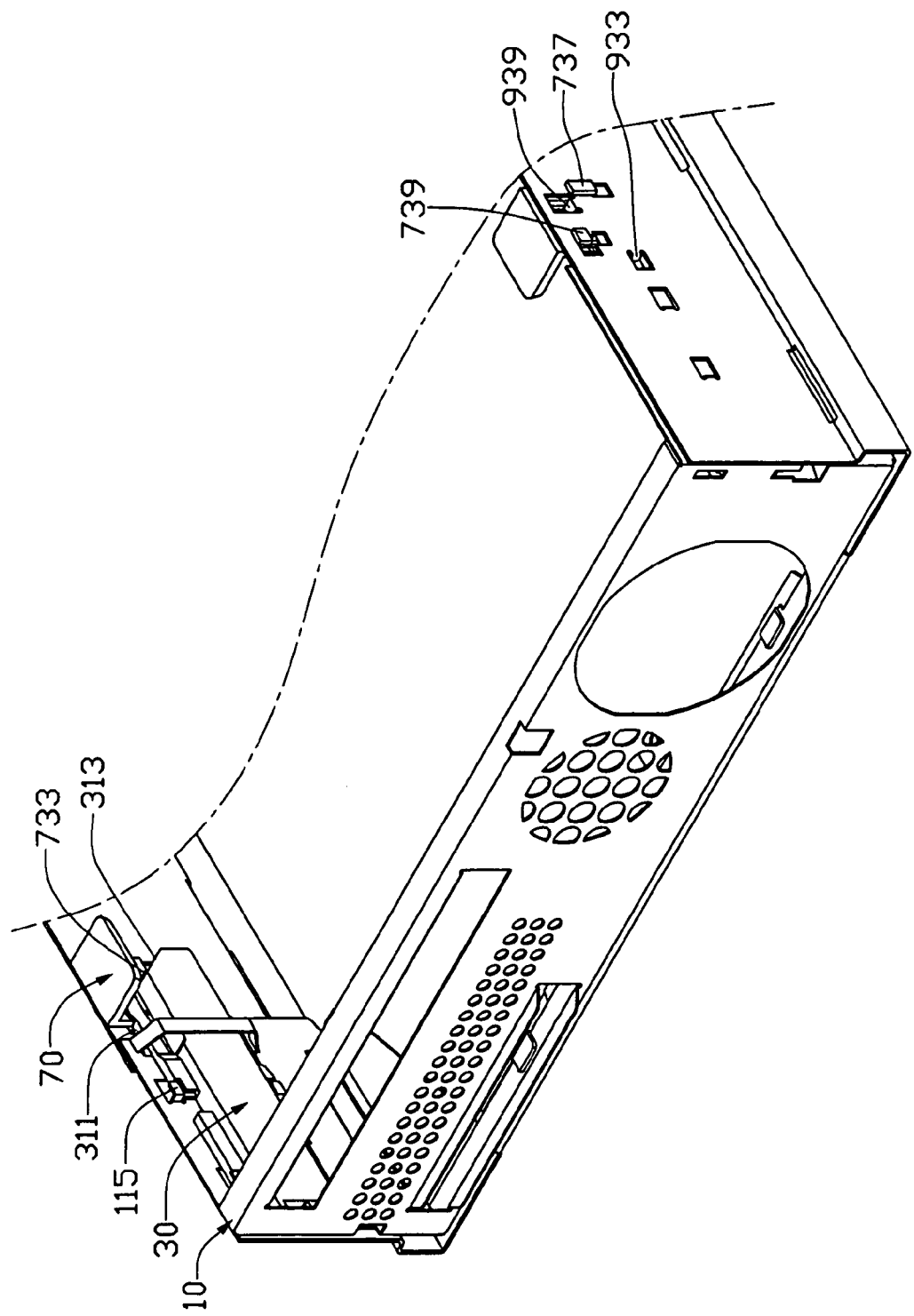
FIG. 5 is an assembled isometric view of FIG. 1.

Referring also to FIG. 5, in assembly of the front panel 10, the sliding groove 31 of the locking member 30 is in alignmemt with the inserting portion 51 of the sliding member 50. Then, the front panel 10 is pushed horizontally to have the inserting portion 51 of the sliding member 50 received in the sliding groove 31 via the guiding portion 311 of the locking member 30. Then, the inserting portion 51 can slide along the sliding groove 31. Simultaneously, the locking protrusion 331 of the locking member 30 snappingly engages in the locking hole 935 of the chassis, and the positioning tabs 911 of the bottom panel 91 engage in the cutouts 133 of the front panel 10. Therefore, the front panel 10 is securely mounted on the chassis 90. Meanwhile, the distal end of the wedge-shaped block 735 of the pressing member 70 faces a gap between the elastic tab 33 of the locking member 30 and the side panel 93 of the chassis 90. The pushing portion 733 of the pressing member 70 is situated above the slanted pushing surface 313 of the locking member 30.

Figure 6:
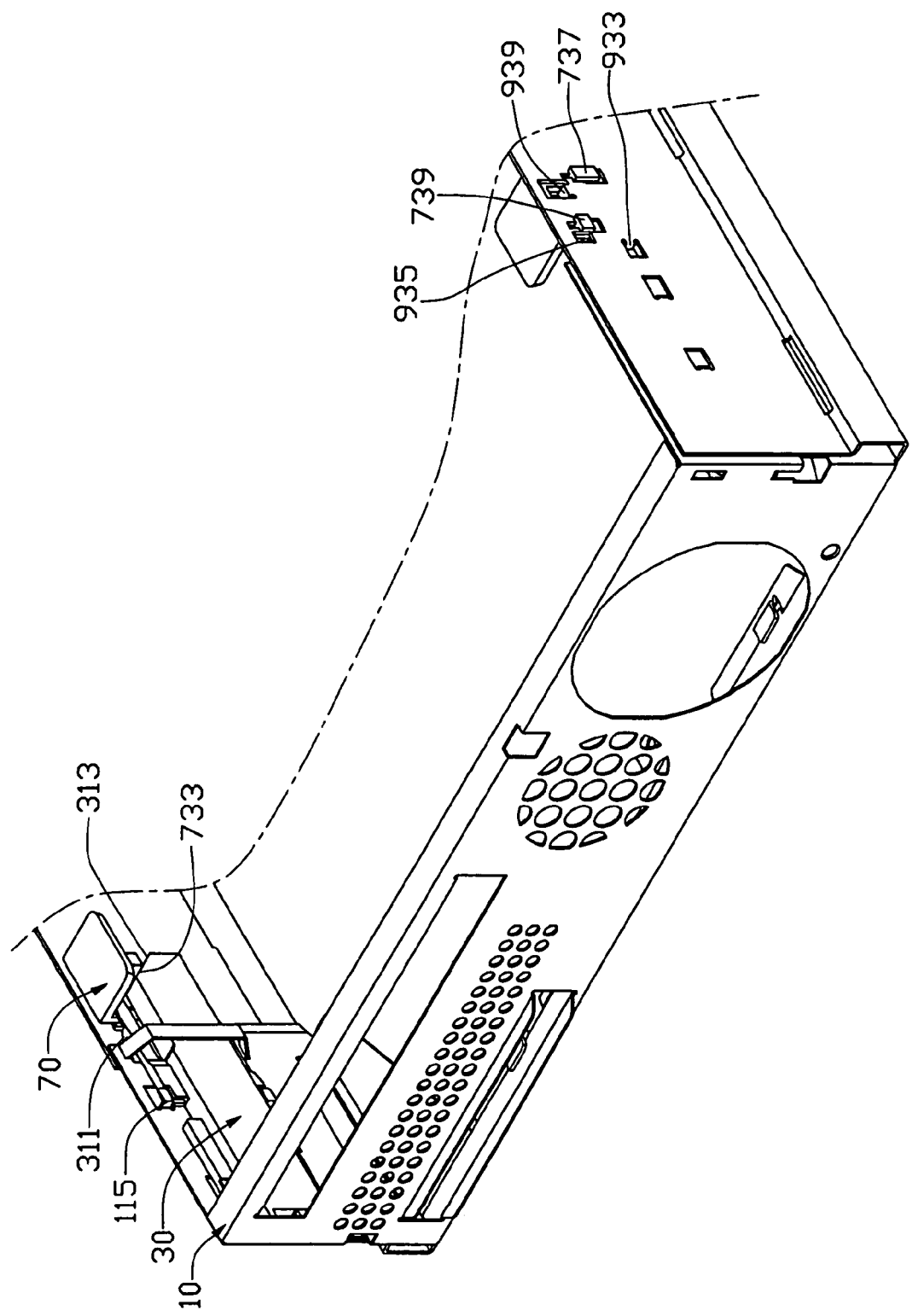
FIG. 6 is similar to FIG. 5, but the locking member being disengaged.

Referring also to FIG. 6, in disassembly of the front panel 10, when the pressing portion 71 of pressing member 70 is pressed downwards, the wedge-shaped block 735 inserts into the gap between the elastic tab 33 of the locking member 30 and the side panel 93 of the chassis 90. The elastic tab 33 is deflected inwardly so that the locking protrusion 331 is drawn out of the locking hole 935 of the side panel 93. When the pressing portion 71 is further pressed, the pushing portion 733 of the pressing member 70 pushes the pushing surface 313 of the locking member 30 to cause the front panel 10 to move forwards. Then, the front panel 10 is taken out from the chassis 90 for access to other components. Once the pressing member 70 is released, the pressing member 70 comes back to an original position due to the spring 80.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

We claim:

1. A mounting assembly of a computer enclosure, comprising:
    a chassis having two opposite side panels, a locking hole defined in each side panel;
    a front panel slidably mounted to the chassis, the front panel having two opposite sidewalls;
    a pair of sliding members attached to the side panels of the chassis, each sliding member having a sliding portion thereon;
    a pair of locking members attached to the sidewalls of the front panel for securing the front panel to the chassis, each locking member defining a sliding groove for the sliding portion of the sliding member sliding therealong, a slanted pushing surface formed on the locking member at a rear end thereof, an elastic tab formed on the locking member at an upper end thereof, a locking protrusion extending outwards from the elastic tab for engaging in the locking hole of the side panel of the chassis to mount the front panel on the chassis; and
    a pair of pressing members adapted to be movably mounted to the chassis for unlocking the locking members, each pressing member having a pressing portion, a slanted pushing portion formed on the pressing member for pushing the slanted pushing surface of the locking member, a wedge-shaped block formed on the pressing member, the pressing portion pressed downwards to drive the wedge-shaped block pushing the elastic tab of the locking member to move for causing the locking protrusion of the locking member to disengage from the locking hole of the side panel of the chassis, the pressing portion further pressed downwards, the slanted pushing portion of the pressing member pushing the slanted pushing surface of the locking member to cause the front panel to move forwards, thereby detaching the front panel from the chassis.

2. The mounting assembly of a computer enclosure as recited in claim 1, wherein the mounting assembly of a computer enclosure further comprises a spring disposed on the pressing member.

3. The mounting assembly of a computer enclosure as recited in claim 2, wherein a protruding tab is formed on the side panel of the chassis for the spring situated between the protruding tab and the pressing member.

4. The mounting assembly of a computer enclosure as recited in claim 1, wherein a pair of T-shaped positioning holes is defined in the side panel of the chassis, and a pair of T-shaped sliding blocks extends from the pressing member for extending through the positioning holes.

5. The mounting assembly of a computer enclosure as recited in claim 1, wherein a plurality of cutouts is defined in the front panel at a lower edge, and a plurality of positioning tabs is formed on the chassis at a front end thereof for engaging in the cutouts respectively.

6. The mounting assembly of a computer enclosure as recited in claim 1, wherein a plurality of recesses is defined in the locking member, and a plurality of hooks is formed on the sidewall of the front panel for engaging in the recesses respectively, thereby securing the locking member on the front panel.

7. A computer enclosure, comprising:
    a chassis having at least one side panel, a sliding portion formed on the side panel thereof, a protruding tab extending perpendicularly from the side panel;
    a front panel slidably mounted to the chassis, the front panel having at least one sidewall, a sliding groove defined in the sidewall for the sliding portion of the chassis sliding therealong;
    an interlocking structure carried by the front panel and the chassis for the front panel secured on the chassis; and a pressing member adapted to be movably attached to the chassis, the pressing member comprising a pressing portion and a supporting portion, a post adjacent to the supporting portion extending vertically from the pressing portion, a spring disposed around the post, a rectangular through hole defined in the supporting portion adjacent to the post, the protruding tab of the side panel extending through the rectangular through hole for retaining the spring, the pressing portion pressed down for disengaging the interlocking structure, thereby detaching the front panel from the chassis, the spring disposed on the pressing member for urging the pressing member to come back to an original position.

8. The computer enclosure as recited in claim 7, wherein the interlocking structure comprises a locking hole defined in the side panel of the chassis and a locking protrusion formed on the front panel.

9. The computer enclosure as recited in claim 8, wherein an elastic tab is formed on the sidewall of the front panel for the locking protrusion formed thereon.

10. The computer enclosure as recited in claim 9, wherein a wedge-shaped block is formed on the pressing member for driving the elastic tab, thereby causing the locking protrusion to disengage from the locking hole of the side panel of the chassis.

11. The computer enclosure as recited in claim 7, wherein a pair of T-shaped positioning holes is defined in the side panel of the chassis, and a pair of T-shaped sliding blocks extends from the pressing member for extending through the positioning holes.

12. The computer enclosure as recited in claim 7, wherein a plurality of cutouts is defined in the front panel at a lower end, and a plurality of positioning tabs is formed on the bottom panel at front end thereof for engaging in the cutouts respectively.

13. The computer enclosure as recited in claim 7, wherein a slanted pushing surface is formed on the interlocking member, and a slanted pushing portion is formed on the pressing member for pushing the slanted pushing surface, thereby unlocking the interlocking structure.

14. A computer enclosure comprising:
a chassis defining an opening at a side thereof, said chassis comprising a side panel adjacent to said opening, a sliding member formed on the side panel thereof, a protruding tab extending perpendicularly from the side panel, the sliding member formed to have a wide inserting portion and a narrow sliding portion attached on the side panel to have the wide inserting portion suspended over the side panel;
a front panel having a side wall with a groove defined thereon a guiding portion formed on the front panel adjacent to a free end of the groove, said front panel slidably and detachably mountable to said chassis along a predetermined direction to cover said opening of said chassis with said wide inserting portion of the sliding member sliding in said groove via the guiding portion, and fixable onto said chassis when said front panel reaches to a final mountable position thereof relative to said chassis along said predetermined direction; and
a pressing member movably attachable to the chassis, the pressing member comprising a pressing portion and a supporting portion, a post adjacent to the supporting portion extending vertically from the pressing portion, a spring disposed around the post, a rectangular through hole defined in the supporting portion adjacent to the post, the protruding tab of the side panel extending through the rectangular through hole for retaining the spring, the spring being disposed on the pressing member for urging the pressing member to a first position disengaged from the front panel, and the pressing portion being pressable to move the pressing member to a second position engaging the front panel so as to release the front panel from the chassis and urge movement of the front panel away from the chassis along a direction opposite to the predetermined direction.

15. The computer enclosure as recited in claim 14, further comprising at least one locking member, corresponding to said at least one pressing member, attachable to said front panel so as to fixably mount said front panel to said chassis when said front panel reaches to said final mountable position thereof along said predetermined direction.

16. The computer enclosure as recited in claim 15, wherein said at least one pressing member is engagable with said at least one locking member in said second position thereof in order to release said front panel and push away said front panel at the same time.

* * * * *